(12) United States Patent
Banfer

(10) Patent No.: US 6,895,364 B2
(45) Date of Patent: May 17, 2005

(54) MATERIALS ANALYTICAL REVIEW AND REPORTING SYSTEM

(76) Inventor: Paul Banfer, 8474 Lambert Dr., Las Vegas, NV (US) 89197

( * ) Notice: Subject to any disclaimer, the term of this patent is extended or adjusted under 35 U.S.C. 154(b) by 0 days.

(21) Appl. No.: 10/373,880

(22) Filed: Feb. 27, 2003

(65) Prior Publication Data

US 2004/0030523 A1 Feb. 12, 2004

Related U.S. Application Data

(63) Continuation of application No. 09/942,119, filed on Aug. 30, 2001, now abandoned.
(60) Provisional application No. 60/229,553, filed on Aug. 30, 2000.

(51) Int. Cl.[7] .............................................. G06F 15/00
(52) U.S. Cl. ..................................... 702/183; 707/102
(58) Field of Search .............................. 702/22–24, 30, 702/34, 62, 68, 80, 119–123, 183, 184; 700/275; 707/1, 5, 102

(56) References Cited

U.S. PATENT DOCUMENTS 5,325,522 A * 6/1994 Vaughn .......................... 707/1
5,428,555 A * 6/1995 Starkey et al. .............. 700/275
5,721,903 A * 2/1998 Anand et al. .................. 707/5
5,832,496 A * 11/1998 Anand et al. ............... 707/102
6,581,012 B1 * 6/2003 Aryev et al. .................. 702/22

* cited by examiner

Primary Examiner—Marc S. Hoff
Assistant Examiner—Mohamed Charioui
(74) Attorney, Agent, or Firm—Arent Fox, PLLC

(57) ABSTRACT

A computer-implemented analytical and reporting system includes an input device, a database and a processor. The input device is operative for inputting analytical data results of a test sample. The database includes an analysis methodology data section, an instrument data section and a forms data section. The processor is operative for receiving from the input device the analytical data results of the test sample. The processor is also operative for receiving from the database analysis methodology data of at least one analysis method, instrument data of at least one analytical instrument and forms data of a desired analytical report form. The processor is also operative for processing the analytical data results and the instrument data using the analysis methodology data and is operative for generating an analytical report produced on the desired analytical report form depicting final analytical results based on the analysis method and the analytical instrument.

1 Claim, 4 Drawing Sheets

MATERIALS ANALYTICAL REVIEW AND REPORTING SYSTEM

This application is a continuation of application Ser. No. 09/942,119 filed Aug. 30, 2001, now abandoned which in turn is a non-provisional application converted from the provisional application No. 60/229,553 filed on Aug. 30, 2000, both of which are incorporated herein by reference for all purposes. Applicants hereby claim the priority of the parent application and the provisional application.

FIELD OF THE INVENTION

The invention is directed to a materials analytical review and reporting system. More particularly, the invention relates to a computer-implemented materials analytical review and reporting system.

BACKGROUND OF THE INVENTION

As a result of their operations, many companies and government-operated facilities produce an effluent that is potentially hazardous to the environment. Federal, state and local governments have passed laws and ordinances regulating such effluent to protect the environment from contamination. Consequently, these companies and government-operated facilities must often perform analytical tests on the effluent and report the results to the government agencies. However, there is no standard manner in which to report to the various government agencies.

Additionally, methods and procedures for performing these analytical tests are often based on the reporting format selected for dissemination to the government agencies. Therefore, manual management and control of the tests are often required to conform the test results to the desired reporting format. Also, conventional systems are usually compartmentalized into separate and sometimes incongruous analytical review and reporting systems, resulting in complicated interfacing schemes. Thus, there has been a long standing need in the environmental testing community, as well as in laboratory communities performing these and other tests, for methods and systems which are more efficient and provide easily producible conforming reports.

SUMMARY OF THE INVENTION

A computer-implemented analytical and reporting system is hereinafter described. The computer implemented analytical and reporting system of the invention includes an input device, a database and a processor. The input device is operative for inputting analytical data results of a test sample. The database includes an analysis methodology data section, an instrument data section and a forms data section. The analysis methodology data section includes methodology data for conducting at least one analysis method. The instrument data section includes instrument data for modeling at least one analytical instrument. The forms data section includes form data for providing a desired one of a plurality of analytical report forms.

The processor is operative for receiving from the input device the analytical data results of the test sample. The processor is also operative for receiving from the database the analysis methodology data of the at least one analysis method, the instrument data of at least one analytical instrument and the forms data of the desired analytical report form. Further, the processor is operative for processing the analytical data results and instrument data using the analysis methodology data and is operative for generating an analytical report produced on the desired one of the analytical report forms depicting final analytical results based on the at least one analysis method and the at least one analytical instrument.

BRIEF DESCRIPTION OF DRAWINGS

Advantages of the invention will become apparent from the follow description of the exemplary embodiments taken in conjunction with the accompanying drawings in which like number reference like elements, wherein.

DETAILED DESCRIPTION OF THE EXEMPLARY EMBODIMENTS

Figure 1:
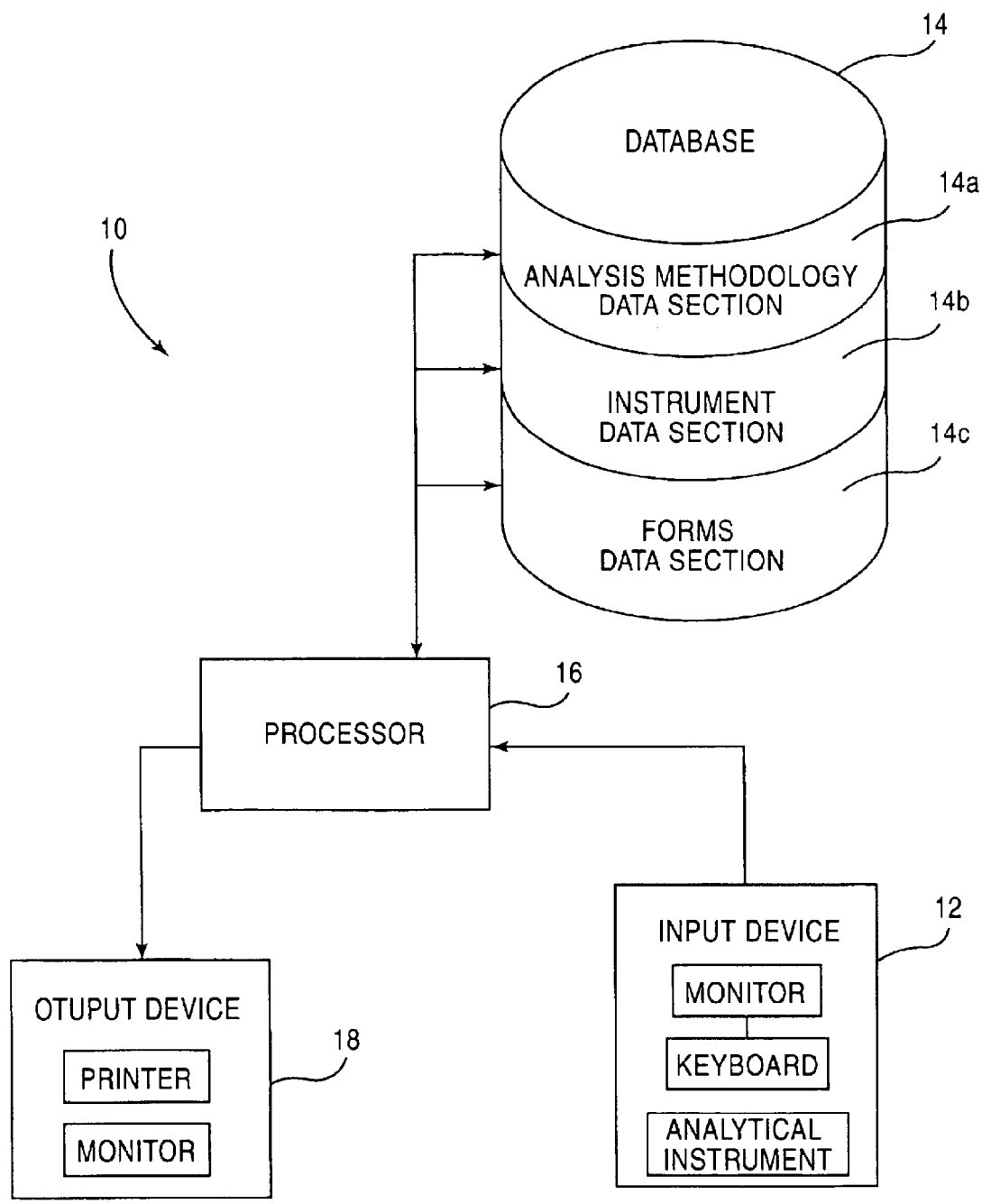
FIG. 1 is a diagrammatical view of a computer-implemented analytical and reporting system of the invention.

As shown in FIG. 1, a computer-implemented analytical and reporting system 10 of the invention includes an input device 12, a database 14, a processor 16 and an output device 18. The computer-implemented analytical and reporting system 10 of the invention is used for analyzing and reporting the analytical results of a test sample. The input device 12 is operative for inputting analytical data results of the test sample. A skilled artisan would appreciate that the analytical data results of the test sample could be inputted by a conventional computer monitor and keyboard. Alternatively, a skilled artisan would appreciate that the analytical data results can also be provided by an analytical instrument itself, such as a pH meter that can electronically output the pH of a liquid.

The database 14 includes an analysis methodology data section 14a, an instrument data section 14b and a forms data section 14c. The analysis methodology data section 14a includes analysis methodology data for conducting at least one analysis method. The instrument data section 14b includes instrument data for modeling at least one analytical instrument. The forms data section 14c includes forms data for providing a desired one of a plurality of analytical report forms.

The processor 16 is operative for receiving, from the input device 12, the analytical data results of the test sample and is operative for receiving, from the database 14, the analysis methodology data of the at least analysis method, the instrument data of the at least one analytical instrument and the forms data of the desired analytical report form. The processor 16 is also operative for processing the analytical data results and the instrument data using the analysis methodology data. Additionally, the processor 16 is operative for generating an analytical report produced on the desired one of the analytical report forms. The desired one of the analytical report forms is generated by the output device 18. As shown in FIG. 1, the analytical report form can be displayed on a monitor or can be printed from a printer. Also, a skilled artisan would appreciate that the report can be stored electronically on disk or in a database. In either event, the analytical report form depicts the final analytical results based on the at least one analysis method and the at least one analytical instrument.

It should be appreciated by one of ordinary skill that the processor 16 described above and in the following is understood not to be limited to only a single device, but may include various types of computerized control devices, which may contain themselves, other processors, microprocessors, analog computers, digital signal processors, fuzzy logic controllers, and other now or future devices other-wise capable of performing a computing and/or controlling function. Therefore, any of a single device comprising integrated circuits or logic devices such as ASCIS, PLD, PLA, FPGA, etc., can be used as well as a standalone or networked computer system, etc. for use as or augmented with the processor 16 without departing from the spirit and scope of this invention.

The attached documents are incorporated herein by reference for all purposes:

1. EISC's Analytical Review and Reporting Suite, Software for Inorganic and Organic Laboratory Production;
2. MARRS Self-Implement Specifications;
3. Metals Analytical Review and Reporting System—Operating Procedure Version 4.0.

Definitions of terms, when explicitly not defined in the following text, are found in the above-incorporated documents.

Figure 2:
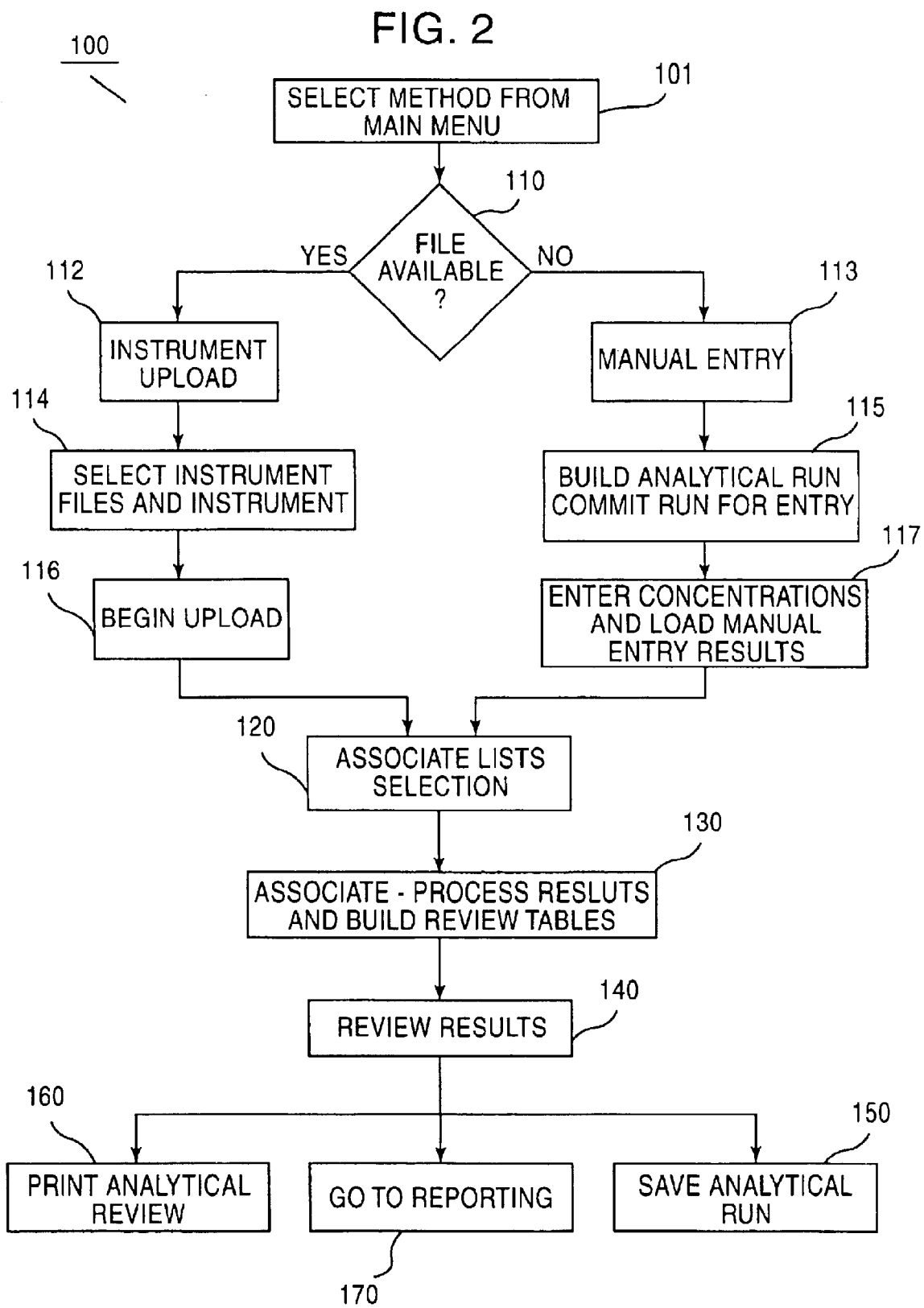
FIG. 2 is a flow-chart diagram illustrating an exemplary process of the invention.

FIG. 2 illustrates an exemplary process 100 for configuring and building an analytical run, as provided in the above incorporated by reference document—EISC's Analytical Review and Reporting Suite, Software for Inorganic and Organic Laboratory Production, The exemplary process 100 begins at step 101 with the selection of a desired or stipulated Method from a Main Menu in a software program according to this invention. Depending on the initial configuration of the software program, the Main Menu may provide any number of numerous analytical run methods, such as, methods for Cyanide, Mercury, etc., as illustrated, for example, on page 1 of the incorporated document "Metals Analytical Review and Reporting System—Operating Procedure Version 4.0".

It should be readily apparent to one of ordinary skill in the art that the choices of What and how many methods are offered at the Main Menu is configuration dependent and may vary as desired and, therefore, is not limited to the two examples provided above. Accordingly, any method encompassing elements and compounds arising from metals, general chemistry, volatile organic chemistry, semi-volatile chemistry, pesticides, herbicides, explosives, etc. may be facilitated; and are understood as being within the scope of this invention.

At step 101, an analytical stage of the exemplary process 100 is invoked by an arbitrary response by the user, for example, by clicking an "Analytical" prompt. Upon invocation of the analytical stage, a result upload and review menu (not shown) is presented to the user. However, at step 110, prior to presentation of the result upload and review menu, upload files for the method selected in step 101 are searched for availability. If the upload files are available, the process proceeds to the Instrument Upload step 112, where the available upload files for the respective instrument(s) are presented to the user. However, if step 110 determines that no upload files are available, an alternate Manual Entry option, as shown in step 113 and further discussed below, is presented to the user.

Presuming the upload files are available, step 112 offers the user a battery of respective instrument files for uploading. Upon selection of the appropriate instrument files at step 114 by the user, the process proceeds to step 116 which uploads the selected file(s). Within the file upload process of step 116, the user can optionally select a print option that provides any one of a hard-copy printout/runlog or an electronic printout/runlog of the uploaded file(s), such as a data file or an on-screen image.

Upon completion of the upload and matching of the uploaded files with the respective instrument(s) at step 116, the process proceeds to step 120 where selection of the association of various standard and non-standard protocols for the uploaded files are performed. A set of association lists, such as, for example, Reporting Lists, Quality Control (QC) Lists, True Value Lists, Review and Qualifier Lists, Calculation Process Lists, Sig Figure/Digits Lists, Print Set Up Lists, Matrix, Z out, Select/De-Select samples, Initial Wt/Final Volume, Batch Samples, Client Info, Rounding Type (CLP Odd/Even, Mathematical, etc.), Low Reporting Limit (MDL/IDL), etc. are provided as a standard suite of association lists for the user. The user can select any one or more of the above enumerated association lists with the uploaded files to form a correspondence or labeling of the selected uploaded files. Optionally, the user can also create a customized list, developed from a subset, superset, ad hoc or edited combination of any of the elements of the standard suite or generate a customized list, not based on any of the standard suite elements, if so desired. Editing or creation of any of the lists can be accomplished by, for example, highlighting a desired list and clicking on a "reset" feature or an "add" feature provided by the process, and performing the appropriate editing steps, according to steps that are well known by one of ordinary skill in the art Next, after selection of the appropriate association list, the user is prompted in step 130 to invoke an association. This is performed by clicking on, for example, a "Process Results" prompt which performs any one or more of applying, assigning, or binding the chosen association lists' information with the appropriate instrument files which were uploaded in the previous steps. The association of step 130 performs processing of the uploaded file information and calculation of QC samples and types (if apropos), and other association-related functions, as needed. Further, tables relating to the associations can be generated for reviewing the forms, as further discussed below, by clicking on, for example, a "Build Review Tables" prompt.

Upon satisfactory completion of step 130, the process continues to step 140, where the results of step 130 are reviewed. A preliminary review of the results can be performed by the user prior to saving the data or forwarding the data for reporting, if so desired. Information can be edited in step 140, and re-calculation of the results in view of the edited information can be performed, by clicking on, for example, a "Re-Calc" prompt.

At the completion of step 140, the process offers any one of three options to proceed. If the user is satisfied with the results of step 140, he can click on, for example, a "Save Analytical Run" prompt to save the results of the analytical run as a data file. This choice is illustrated in FIG. 2 as step 150. Further, the user can, if desired, choose to print an Analytical Review Report in step 160 by clicking on the appropriate prompt provided by the process. The Analytical Review Report is a run report summary that may contain any one or more of a Sample ID, Parameter, Dilution Factor, PASS/FAIL, Raw Result, Matrix, Recovery, QC Criteria, RPD, Analytical Date, Units, Initial and Final Volume, etc., as desired. Finally, in step 170 the user can proceed onto the Reporting stage by clicking on the appropriate prompt provided by the process.

Returning to step 110, when the upload files are not found and a Manual Entry path is taken, the process offers a building an Analytical Run process, as indicated by step 115. Necessary samples from the laboratory instrument measurement system (LIMS) are retrieved and information relating to the samples are manually input into the process by the user. As an initial matter, the user can enter heading information, for example, the sample time, total number of samples, date, start time, end time, time span, operator initials, run number, etc., as desired. Upon completion of the inputting of the pertinent information, the analytical run can be further built by selecting appropriate QC types and/or sample ID's, as provided by the process (not shown). Once the sample information is input and the appropriate information is selected, the run is considered built. Thereafter, the user can "Commit the Run for Entry" by clicking on the appropriate prompt provided by the process.

After the run is committed to entry, the process continues to step 117 where the user is prompted to enter the concentration and/or particulate values corresponding to the samples input in step 117. Upon completion of the inputting of the values, the user can "Load the Manual Entry Results" by clicking on an appropriate prompt. Upon completion of the loading of the manual entries, the process continues to step 120, which proceeds with the same association process as discussed above.

It should be appreciated that the above processes and methods can be formulated as a software program for access by the memory of a computing system, capable of driving a logic device, such as a processor 16 or any other logic device capable of performing the steps listed above. Therefore, various graphical interface methods via a mouse or any other input device for use in selecting, invoking, editing selections, etc., as is well known in the programming arts are understood to be within the purview of the methods used herein.

While the above exemplary process lists the chronology of steps as following a "top-down" sequence, it should be obvious to one of ordinary skill that portions of the steps or complete steps may be performed out of sequence or repeated, as is desired to provide necessary or additional features. For example, steps 113–117 may be repeated to build several runs to form a set of runs, before progressing onto step 120. Additionally, while the above steps describe the user activated prompts as having a designated "title", for example, "Build Review Tables", or "Re-Calc", etc., it should be understood that the prompts may be titled with any nomenclature or function as deemed appropriate. Accordingly, various modifications of the above steps and elements of the steps such as incorporating additional steps or compacting several steps, for example, may be made by one of ordinary skill in the art without departing from the scope and spirit of this invention.

Figure 3:
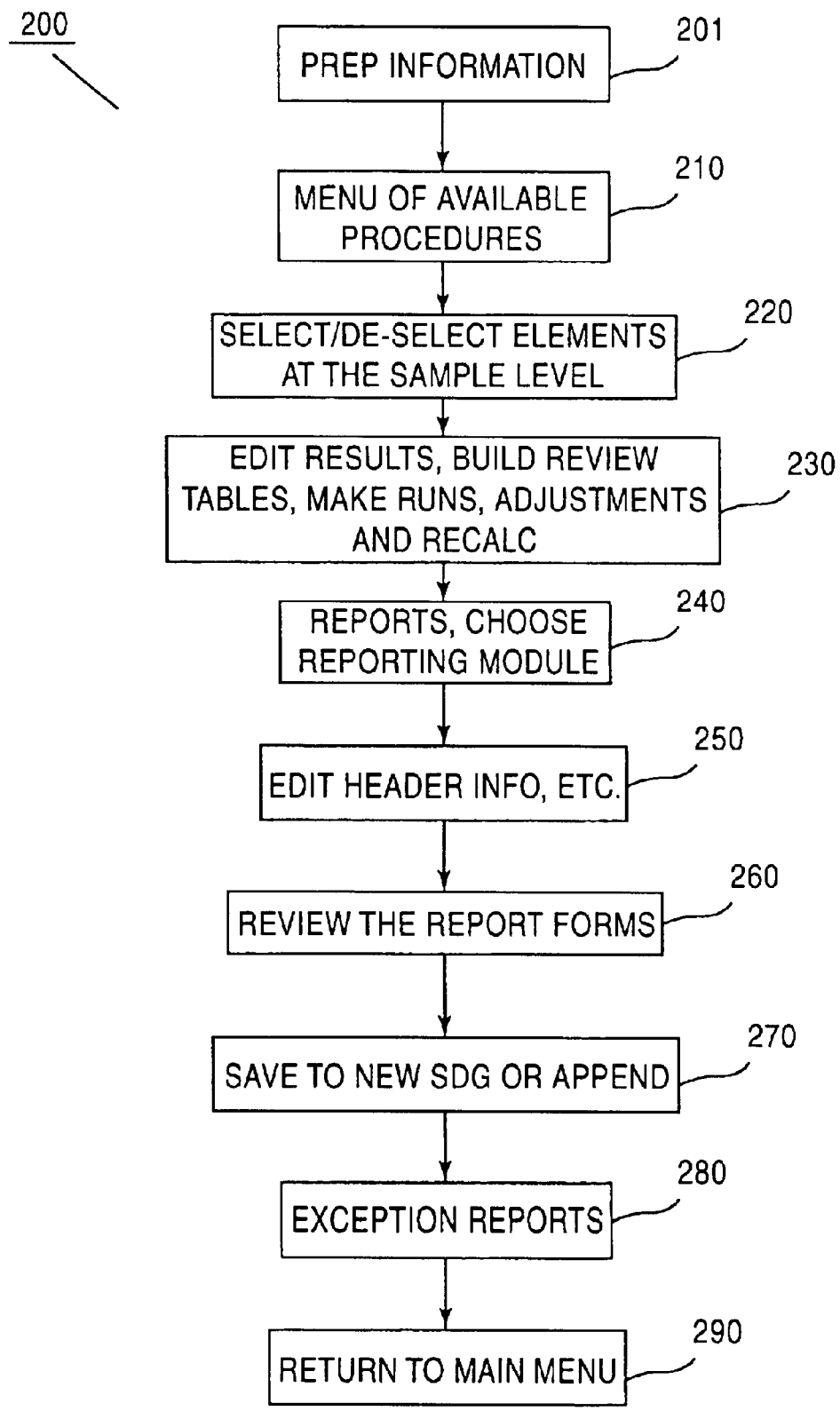
FIG. 3 is a flow-chart diagram illustrating another exemplary process of the invention.

FIG. 3 illustrates a flow chart depicting the steps of an exemplary reporting process 200 according to this invention. The reporting process 200 may be initiated by the user clicking, in any of the menus discussed in the above embodiment(s), an appropriately designated "Reporting" prompt. Upon initiation of a "Reporting" prompt, five folders are presented to the user.

The first folder presented in the exemplary reporting process 200 is the "Prep Information" folder, as designated by step 201. Upon invocation of step 201, preferably by clicking on an "Prep Information" prompt, for example, the process provides a menu of several available procedures, as indicated by step 210. These procedures may include procedures for retrieving Client Info from the IMS system, Adjusting the Matrices, Setting Date Collected and/or Date Received, Sample Batching, Adjusting QC Types, Setting Run Numbers (analytical), Z-Flag samples being not reported, Setting Analytical Date, Selecting/De-Selecting Samples, Re-Sequencing ICV's, ICB's, CCV's and CCB's, and etc. Any of these and the following procedures discussed below may be executed as desired by the user, by clicking on an appropriately designated prompt or menu tag.

Accordingly, it should be appreciated that any of these tasks may be executed in a standardized sequence to facilitate commonality of operation. For demonstrative purposes, for example, one such sequence may be for the user to click on a parameter "button" to select the desired parameter, highlight the associated sample, initiate set, and hit "return". As stated in the earlier exemplary processes, a "Re-Process/Re-calc" button may be provided for activation to enable any changes to be applied to the final result.

After completion of any of the procedures listed in step 210, the exemplary process proceeds to the second folder "Select/De-Select Elem" denoted in FIG. 3 as step 220, where analytes are selected and de-selected at the sample level. Step 220 enables the user to select which analytes(s) are to be reported from which analyses. For example, a sample of ICP with multiple analytes can be reported with each individual analysis. However, since all analytes may not be reported from the same analysis, due to dilution and/or other quality control issues, the Select/De-Select step 220 provides the ability to individualize the reporting of the analytes.

After the user selects the appropriate analytes and is satisfied with the results from the above steps, whether by inspecting the data with a QC criteria or other criteria, the exemplary process 200 may proceed to the next folder, denoted in FIG. 3 as step 230. Step 230 provides a process folder which contains several options such as, "Edit Results, Build Review Tables, Make Runs Adjustments and Recalc", for example. If the user chooses the Edit Results option in step 230, he can perform a thorough review of the results that are to be reported on the forms to be selected. As an illustrative example, data encompassing parameter lists, dilution factors, collection and receipt dates, IDLs, RDLs, %R, RPDs, etc., can be reviewed and edited within this folder, if desired. If the user desires to make global changes (which affect all samples), the user can chose the "Run Adjustments" option and make changes to any one or more parameters relating to IDL Values, MDL Values, RDL Values, Instrument Units, Report Units, Unit Conversion, TCLP Reg Limits, Sig Figs and Sig Digits, Main Parameter, Report Method, LDR, Lid Method and Instrument, etc., for example.

Upon the completion of any one of the above options, the user may continue the process by clicking on a prompt(s) corresponding to the "Re-Calc" and "Rebuild Review Table" option made available in this folder, to ensure that any changes and adjustments which are made are applied to the final results.

Prior to printing any of the necessary forms from the above steps, the user may wish to review several bits of information relating to the "Reports" and designate the attendant "Reporting Module". Accordingly, a "Reports" folder, denoted in FIG. 3 as step 240 is provided as an option to the user. Upon invocation of an appropriately designated prompt, the exemplary process proceeds to step 250, which provides the user the option of reviewing and editing information in the report's report header section according to several various procedures. Step 250 provides several procedures such as reviewing and/or editing information relating to the "Report Header" such as the SDG No., Client Name, Contract/Project, Lab Code, Case No., SAS No., Method, SOW No., Level, Report Header Text, Report Footer Text, SDG Comments, High/Low Reporting Limits, Client ID, Lab ID, etc. Additionally, a "Z Out Samples" option is provided which enables the user to select samples that are not associated with the SDG for which Form 1 processing is not desired and yet provide the sample information to be Z'd out to the Run Log. Thus, data not in the SDG/Form 1 processing format can be conveniently output in Z data format in the Run Log.

Concomitant with the "Z Out Samples" option, step 250 further provides options for "Select Samples in Run", which selects samples and the QC to be reported; "Sample Comments", which are comments made at the sample level (which will appear on the appropriate Form 1's); "Color, Clarity and Texture" (which will appear on the appropriate Form 1's); "Edit MSA's or IEC's"; "Review Sources" (which appears for forms 2a, 2b, 4, and 7); "Update Parameters at an SDG Level"; and "Direct Form Edit".

The user may select any of the above options as desired. Upon satisfactory completion of the desired option(s), the process proceeds to step 260, which provides the user the ability to print and/review the selected forms by clicking on the appropriate module, selecting the forms needed and selecting "Print" or "Review on Screen". From step 260, the process provides at step 270 the user the option of "Saving to New SDG" or "Appending to Existing SDG", the SDG set being evaluated.

After the user has elected one of the above options, the process proceeds to the final folder, as denoted in FIG. 3 as step 280. Step 280 provides "Exception Reports", where any of the following: Sample ID, Client ID, Exception Type, Parameter, QC Type, Result, Recovery, RPD, Low Limit, High Limit, RPD Limit, and etc., can be printed in an SDG specific Exception Report.

Once the "Exception Report" has been printed (either in a digitally reproducible format, hard-copy, email, etc.), the process proceeds to step 290, where the user can optionally or automatically return to the exemplary process of FIG. 2, to enable selection of the next method for selection.

Figure 4:
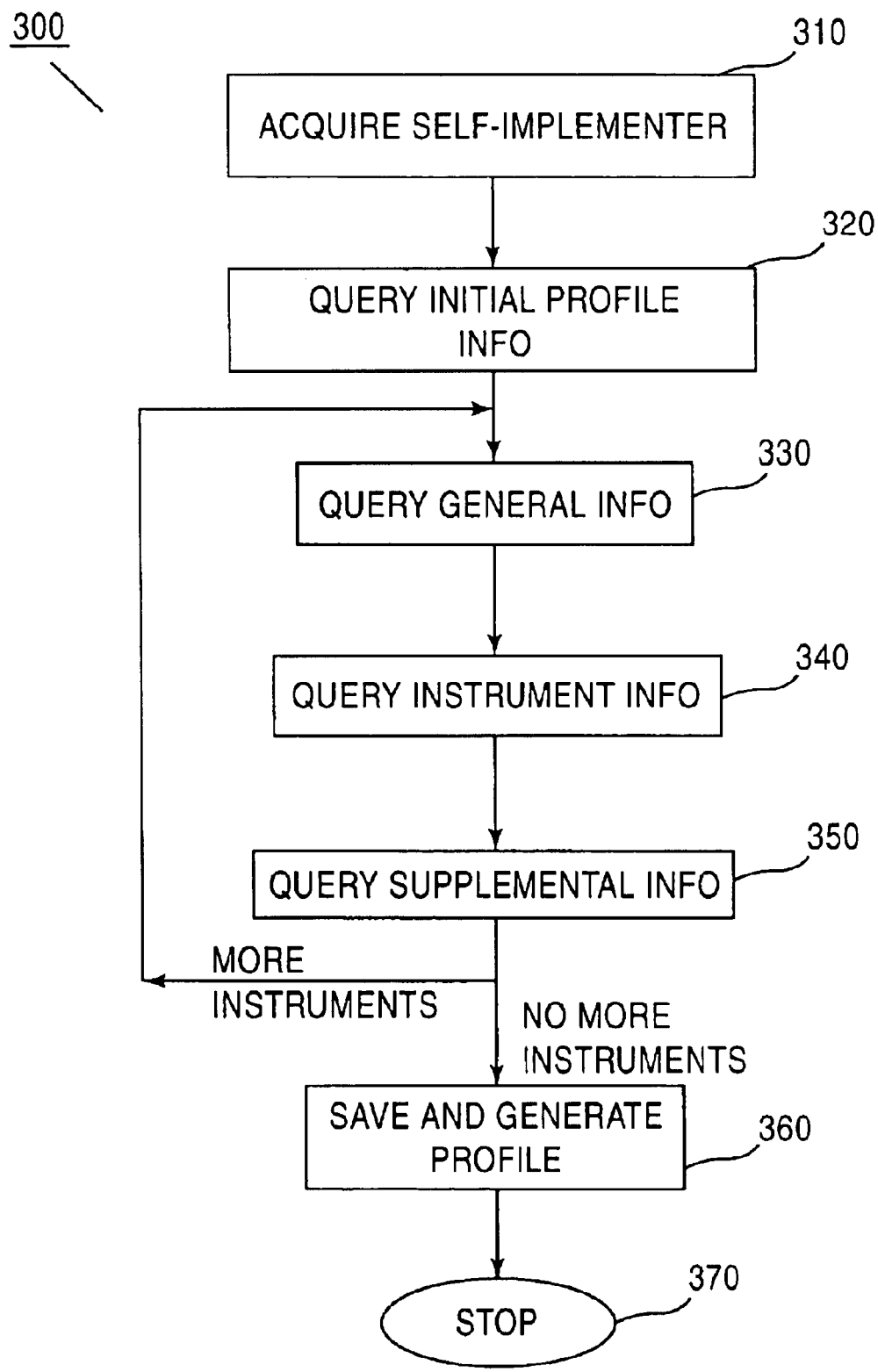
FIG. 4 is a flow-chart diagram illustrating another exemplary process of the invention.

FIG. 4 is a flow chart describing an exemplary self-implementing process 300 of this invention. The process 300 begins at step 310 where the user receives the self-implementer in a software form via a hard copy or an electronic media and installation is initiated. For example, the user may receive the self-implementer in the form of a CD with instructions for installation, and the user may perform the necessary steps for installation. Alternatively, the user may receive the self-implementer via an electronic mailing service or online and the self-implementer is initiated automatically upon receipt or invocation (e.g., unzipped, for example), or by performing the necessary installation steps dictated by the form of delivery. Thus, any available mechanism for receiving the self-implementer may be used to facilitate the dissemination and installation of the self-implementer to the user. The process next proceeds to step 320 where the self-implementer automatically queries the user for an initial group of required information for the profile being developed. For example, the self-implementer would request entry or verification of the Lab Name and Lab Abbreviation, as an initial item. Other initial items, of course, may be solicited from the user, if desired.

Upon completion of step 320, the process continues onto step 330 where general information regarding the profile would be solicited from the user. The general information would encompass information such as: Number of Instruments, Instrument Category, Key Code, Selection of Reporting Module, Selection of Matrices, and Directory Paths, for example. It is readily apparent that other information may be solicited from the user, if so desired.

After step 330, the process continues onto step 340 where instrument information would be solicited and edited from the user. The instrument information would encompass information such as: Additional information of the Instrument, Initial and Final Volumes, Editing of the Analyte List, Entering and Copying of the Standard Reporting List, Editing and Copying the Standard QC Criteria List, and Entering and Copying the Standard Truevalue List. Additional information may be processed as desired.

After step 340, the process continues onto step 350 where Supplemental information is requested. The supplemental information would encompass information relating to IEC information (as needed for ICP related profile), and Editing of the Naming Conventions. Obviously, additional information may be solicited, if desired.

Upon completion of step 350, and according to the number of instruments indicated in step 320, the process automatically loops back to step 330 to initiate a new query regarding the next instrument to be profiled. The process continues as before through steps 330–350, until all the instruments are profiled at which point the exemplary process proceeds onto step 360 and saves the data collected from the user and generates a default profile. Upon completion of step 360, the process stops at step 370.

It should be appreciated that while the above exemplary embodiments describe aspects of the invention in terms of the prescribed process flows, it should be apparent that variances of implementation are available to one of ordinary skill in the art. In particular, differences in the analytical process, connectivity to analytical instrumentation, and processing of results may be made without altering the intended purpose of this invention. Accordingly, this invention can be applied to a plethora of physical agents and, therefore, is not limited to only those materials, elements, compounds, contaminants, etc., as described, herein. Due to this inherent flexibility, this invention is configurable with process modules that enable the connection of the exemplary processes to various analytical instruments to devise the necessary features, reports and analysis. Thus, the analysis and reporting of an effluent level in a sample is not limited to those examples provided in the above-incorporated documents, as any now or future instrument that is capable of being interfaced with this invention may be utilized, as desired.

Thus, it should be apparent, given the flexibility of the implementation of this invention, that any of the above embodiments of this invention may be implemented as a single process, as parallel threads, hybrid, peer-to-peer, server-client, network, master-slave, or any now or future system control and information management system.

It will be recognized by one of ordinary skill in the art that changes may be made in the above-described embodiment of the invention without departing from the inventive concepts thereof. It is understood, therefore, that the invention is not limited to the particular embodiments disclosed, but is intended to encompass any modification which are within the scope and spirit of the invention.

What is claimed is:

1. A computer-implemented analytical and reporting system for a test sample, the system comprising:
   input means operative for inputting analytical data results of the test sample;
   a database including an analysis methodology data section, an instrument data section and a forms data section, the analysis methodology data section including analysis methodology data for conducting at least one analysis method, the instrument data section including instrument data for modeling at least one analytical instrument, the forms data section including forms data for providing a desired one of a plurality of analytical report forms; and a processor operative for receiving, from the input means, the analytical data results of the test sample and receiving, from the database, the analysis methodology data of the at least one analysis method, the instrument data of at least one analytical instrument and the forms data of the desired analytical report form, for processing the analytical data results and instrument data using the analysis methodology data and for generating an analytical report produced on the desired one of the analytical report forms depicting final analytical results based on the at least one analysis method and the at least one analytical instrument.

* * * * *